(12) United States Patent
Singh et al.

(10) Patent No.: US 10,791,161 B2
(45) Date of Patent: Sep. 29, 2020

(54) TEMPORAL TRANSACTION LOCALITY IN A STATELESS ENVIRONMENT

(71) Applicant: Cisco Technology, Inc., San Jose, CA (US)

(72) Inventors: Amit Singh, Woodside, CA (US); Bhanushree Krishnamurthy, Fremont, CA (US); Alon Shlomo Bernstein, Monte Sereno, CA (US); Fabio Giannetti, Los Gatos, CA (US); Brian Patrick Bresnahan, Bedford, NH (US)

(73) Assignee: Cisco Technology, Inc., San Jose, CA (US)

( * ) Notice: Subject to any disclaimer, the term of this patent is extended or adjusted under 35 U.S.C. 154(b) by 29 days.

(21) Appl. No.: 15/879,504

(22) Filed: Jan. 25, 2018

(65) Prior Publication Data

US 2019/0230141 A1    Jul. 25, 2019

(51) Int. Cl.
  H04L 29/06    (2006.01)
  H04L 29/08    (2006.01)
  G06F 9/46     (2006.01)

(52) U.S. Cl.
  CPC ............ *H04L 65/608* (2013.01); *G06F 9/466* (2013.01); *H04L 29/08045* (2013.01); *H04L 65/80* (2013.01); *H04L 67/2804* (2013.01); *H04L 69/168* (2013.01)

(58) Field of Classification Search
  CPC . H04L 65/608; H04L 29/08045; H04L 65/80; H04L 69/168; G06F 9/466
  USPC .......................................................... 709/231
  See application file for complete search history.

(56) References Cited

U.S. PATENT DOCUMENTS

| | | | | |
|---|---|---|---|---|
| 6,650,652 | B1* | 11/2003 | Valencia | H04L 47/10 370/352 |
| 7,596,097 | B1* | 9/2009 | McCowan | H04L 43/00 370/248 |
| 9,148,386 | B2* | 9/2015 | Gahm | H04L 47/31 |
| 9,531,552 | B2* | 12/2016 | Benton | H04L 12/12 |
| 2009/0249417 | A1* | 10/2009 | Goguen | H04L 12/2801 725/111 |
| 2010/0172368 | A1* | 7/2010 | Eng | H04J 1/00 370/432 |
| 2014/0269314 | A1* | 9/2014 | Ozer | H04L 65/4084 370/235 |
| 2015/0067815 | A1* | 3/2015 | Overcash | G06F 1/32 726/11 |
| 2016/0277299 | A1* | 9/2016 | Kadaba | H04L 12/56 |
| 2016/0294991 | A1* | 10/2016 | Guo | H04L 65/1006 |
| 2016/0366022 | A1* | 12/2016 | Finkelstein | H04L 41/12 |

(Continued)

OTHER PUBLICATIONS

International Telecommunication Union, "Series J: Cable Networks and Transmission of Television, Sound Programme and Other Multimedia Signals," 2004 (Year: 2004).*

*Primary Examiner* — Tonia L Dollinger
*Assistant Examiner* — Schquita D Goodwin
(74) *Attorney, Agent, or Firm* — Merchant & Gould P.C.

(57) ABSTRACT

Temporal transaction locality in a stateless environment may be provided. First, a current message having an identifier may be received. Next, it may be determined, based on the identifier, that the current message is associated with a transaction. Then, in response to determining that the current message is associated with the transaction, the current message may be sent to a target service instance corresponding to the transaction.

18 Claims, 3 Drawing Sheets

(56) References Cited

U.S. PATENT DOCUMENTS

2017/0034059 A1* 2/2017 Annamraju ......... H04L 65/4092
2017/0054741 A1* 2/2017 Steele ................. H04L 63/1416
2017/0208005 A1* 7/2017 Luke ................... H04L 47/125
2017/0324750 A1* 11/2017 Khan ................... H04L 63/123
2017/0339277 A1* 11/2017 Lewinson ......... H04M 3/53341
2018/0359336 A1* 12/2018 Chattopadhyay ....... H04L 67/32

* cited by examiner

TEMPORAL TRANSACTION LOCALITY IN A STATELESS ENVIRONMENT

TECHNICAL FIELD

The present disclosure relates generally to stateless environments.

BACKGROUND

A Hybrid Fiber-Coaxial (HFC) network is a broadband network that combines optical fiber and coaxial cable. It has been commonly employed globally by cable television operators. In a hybrid fiber-coaxial cable network, television channels are sent from a cable system's distribution facility to local communities through optical fiber trunk lines. At the local community, a box translates the signal from a light beam to electrical signal, and sends it over cable lines for distribution to subscriber residences. The optical fiber trunk lines provide adequate bandwidth to allow future expansion and new bandwidth-intensive services.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Temporal transaction locality in a stateless environment may be provided. First, a current message having an identifier may be received. Next, it may be determined, based on the identifier, that the current message is associated with a transaction. Then, in response to determining that the current message is associated with the transaction, the current message may be sent to a target service instance corresponding to the transaction.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Conventional micro-services based systems may be stateless. For example, a transaction may be handled by any one of several instances of a service. A state-less service can scale, upgrade, shrink, or expand without impacting the overall environment. Accordingly, state-less environments may be highly available.

Data Over Cable Service Interface Specification (DOCSIS) environments, on the other hand, may be state-full. In other words, a single transaction in DOCSIS, may span multiple messages (i.e., requests). For example, in DOCSIS, a modem transaction may involve a 3-way handshake comprising multiple messages: i) a request; ii) response; and iii) an acknowledgement (i.e., an ack). The timeout for most DOCSIS transactions (i.e., 3-way handshakes) may comprise 200 ms. The messages in the 3-ways handshake may need to be handled by the same instance of a service. Also, in the data path, queues may be maintained per packet over which Quality of Service (QoS) is applied. To apply QoS, packets may need to be sent to the same instance of a service as long as there may be packets in the queue.

Embodiments of the disclosure may implement DOCSIS in a state-less manner to achieve, for example, scalability, availability, upgrades, and elasticity goals for an overall Cable Modem Termination System (CMTS). The CMTS application may be portable across application deployment platforms, so it may not dependent on any special or unique infrastructure services that may tie it to a particular application deployment platform. With embodiments of the disclosure, service instances may grow and shrink, so nailing down classes of service requests to particular instances of a service may be undesirable as it may create a nailed down environment. In other words, embodiments of the disclosure may route messages corresponding to a transaction to a same target service instance to preserve transaction boundaries across multi-part/multi-message transactions while keeping, for example, the overall environment stateless and connectionless (e.g., unpinned).

Figure 1:
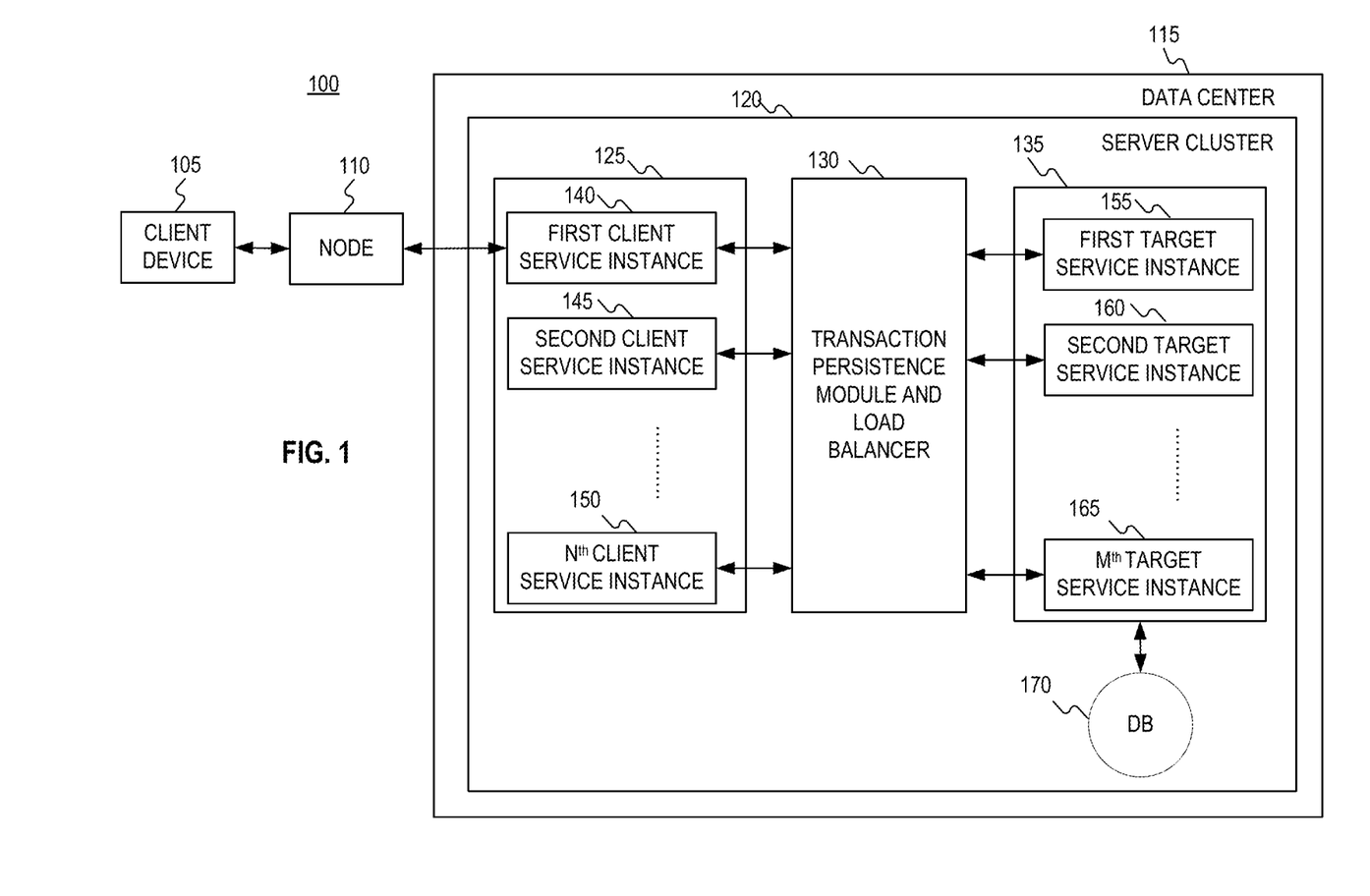
FIG. 1 is a block diagram of a system for providing temporal transaction locality in a stateless environment.

FIG. 1 is a block diagram of a system 100 for providing temporal transaction locality in a stateless environment. As shown in FIG. 1, system 100 may comprise a client device 105, a node 110, and a data center 115. Data center 115 may comprise a server cluster 120. Server cluster 120 may comprise a plurality of client service instances 125, a transaction persistence module and load balancer 130, and a plurality of target service instances 135. Plurality of client service instances 125 may comprise a first client service instance 140, a second client service instance 145, and an Nth client service instance 150. Plurality of client service instances 125 may grow or shrink and therefore may comprise any number of client service instances and is not limited to three. Plurality of target service instances 135 may comprise a first target service instance 155, a second target service instance 160, and an Mth target service instance 165. Plurality of target service instances 135 may grow or shrink and therefore may comprise any number of target service instances and is not limited to three. Server cluster 120 may also include a database 170. Database 170 may comprise a state database and may be common to all instances comprising plurality of target service instances 135.

Client device 105 may comprise, but is not limited to, a cable modem, a cellular base station, a tablet device, a mobile device, a smart phone, a telephone, a remote control device, a set-top box, a digital video recorder, a personal computer, a network computer, a mainframe, a router, or other similar microcomputer-based device. Node 110 may be deployed at an edge of a cable network (e.g., a Hybrid fiber-coaxial (HFC) network). Node 110 may comprise, but is not limited to, an amplifier or an Remote Physical Layer (R-PHY) node where the physical layer (i.e., PHY) of a cable headend Cable Modem Termination System (CMTS) (e.g., Converged Cable Access Platform (CCAP)) may be shifted to fiber nodes (e.g., R-PHY nodes) in a network comprising node 110. Client device 105 may be connected to and served by node 110.

Plurality of client service instances 125, transaction persistence module and load balancer 130, and plurality of target service instances 135 may comprise a plurality of Virtual Network Function (VNF) containers instantiated in data center 115 on server cluster 120. The plurality of VNF containers may each comprise software modules, that when taken as a whole, may provide functionality of a cloud Cable Modem Termination System (cCMTS) instantiated in data center 115. The plurality of VNF containers may reside on the same server (i.e., service cluster 120) or may reside on different servers or in different data centers. Notwithstanding, plurality of client service instances 125, transaction persistence module and load balancer 130, and plurality of target service instances 135 may be embodied in hardware and/or in software (including firmware, resident software, micro-code, etc.) and are not limited to being hardware devices.

As shown in FIG. 1, system 100 may comprise N clients service instances (i.e., plurality of client service instances 125) requesting a service from M target service instances (i.e., plurality of target service instances 135). These instances may grow or shrink over time (i.e., N and M may each become larger or smaller). System 100 may be state less; however, state may be stored outside the N clients service instances and the M target service instances and may be accessible to any of the instance. Plurality of client service instances 125 may be aware of a current number of the instances of plurality of target service instances 135 at any time.

Plurality of client service instances 125 may maintain a database (e.g., in transaction persistence module and load balancer 130 or in database 170 that is common to each of plurality of client service instances 125) where it may create entries per transaction (such as a modem or a flow). When a message comes in to one of the plurality of client service instances 125, it may look up in the database to see when was the last time a request from the same requester came in. If it is within a predetermined amount of time of the last received message in the transaction, the message may be sent to the same instance of the target service instance as the last received message in the transaction, otherwise it may be sent to any of the plurality of target service instances 135.

Figure 2:
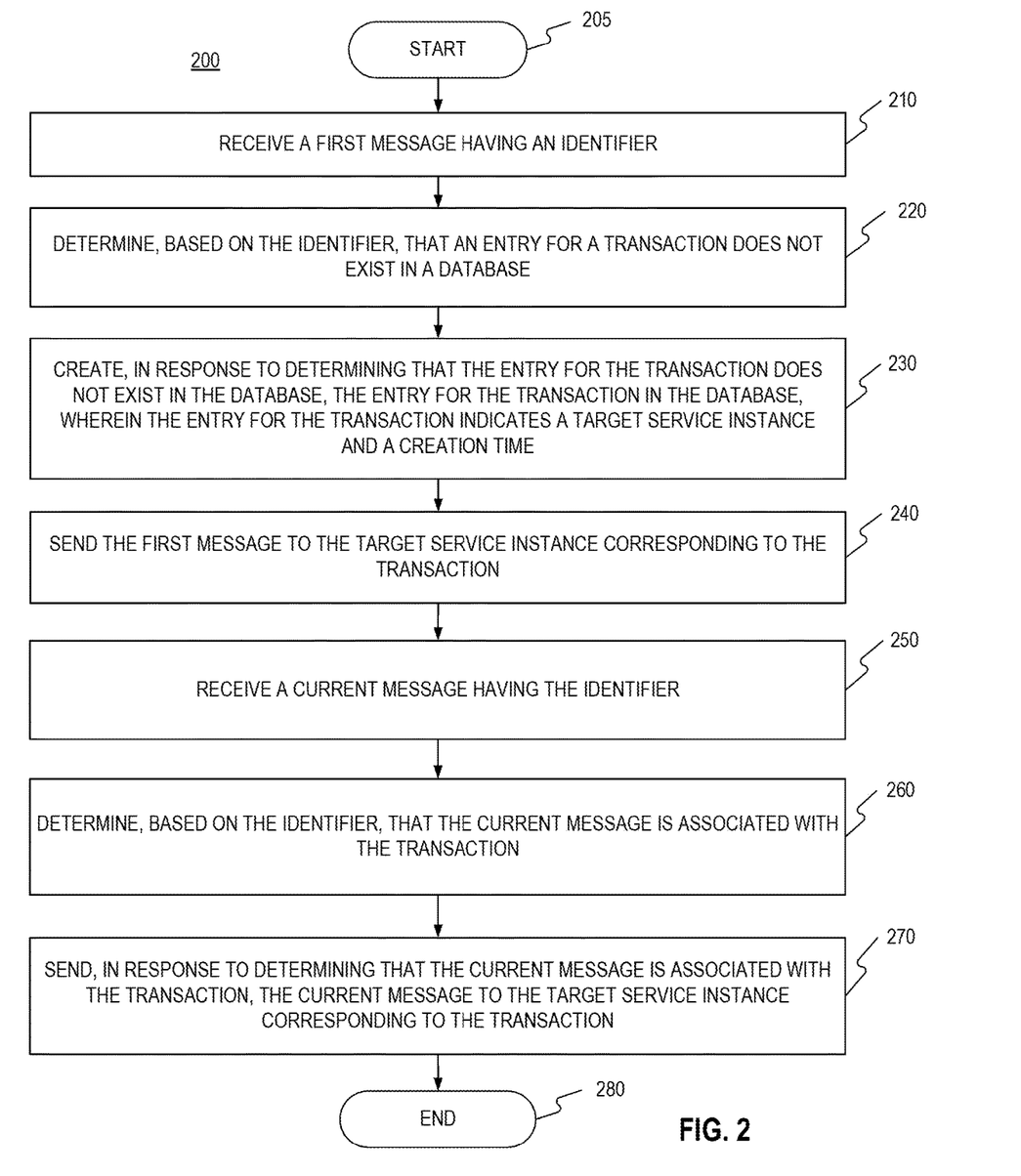
FIG. 2 is a flow chart of a method for providing temporal transaction locality in a stateless environment.

FIG. 2 is a flow chart setting forth the general stages involved in a method 200 consistent with an embodiment of the disclosure for providing temporal transaction locality in a stateless environment. Method 200 may be implemented using ones of plurality of client service instances 125, transaction persistence module and load balancer 130, and ones of plurality of target service instances 135 as described in more detail above with respect to FIG. 1. Ways to implement the stages of method 200 will be described in greater detail below.

Method 200 may begin at starting block 205 and proceed to stage 210 where first client service instance 140 may receive a first message having an identifier. For example, the first message may comprise a message in a DOCSIS transaction received from client device 105 through node 110. The identifier, for example, may comprise or be based on: i) a Media Access Control (MAC) address of a Cable Modem (CM) corresponding to client device 105 from which the first message was received; ii) a Remote Physical Layer (R-PHY) node identifier corresponding to node 110 from which the first message was received; and iii) a Layer 2 Tunneling Protocol Version 3 session corresponding to the first message.

From stage 210, where first client service instance 140 receives the first message, method 200 may advance to stage 220 where first client service instance 140 may determine, based on the identifier, that an entry for a transaction does not exist in a database. For example, transaction persistence module and load balancer 130 may include the database. First client service instance 140 may perform a lookup in the database for the transaction based on the received identifier and determine that an entry for the transaction does not exist in the database.

Once first client service instance 140 determines, based on the identifier, that the entry for a transaction does not exist in the database in stage 220, method 200 may continue to stage 230 where first client service instance 140 may create, in response to determining that the entry for the transaction does not exist in the database, the entry for the transaction in the database. For example, to determine which of plurality of target service instances 135 to send the first message to for servicing, first client service instance 140 may compute a hash on the identifier to select one of plurality of target service instances 135. In this example, the computed hash may indicate first target service instance 155. The entry for the transaction may indicate, but is not limited to, first target service instance 155, the identifier, and a creation time. The creation time may comprise the time that the first message was received by first client service instance 140.

After first client service instance 140 creates the entry for the transaction in the database in stage 230, method 200 may proceed to stage 240 where first client service instance 140 may send the first message through transaction persistence module and load balancer 130 to first target service instance 155 corresponding to the transaction. For example, first client service instance 140 may forward the first message to the computed target instance, in this example, first target service instance 155.

From stage 240, where first client service instance 140 sends the first messages to first target service instance 155 corresponding to the transaction, method 200 may advance to stage 250 where first client service instance 140 may receive a current message having the identifier. For example, the current message may comprise a message in a DOCSIS transaction received from client device 105 through node 110. The current message may be a message in the same transaction as the first message, however, the current message may be subsequent in time relative to the first message. The current message may have the same identifier as the first message.

Once first client service instance 140 receives the current message having the identifier in stage 250, method 200 may continue to stage 260 where first client service instance 140 may determine, based on the identifier, that the current message is associated with the transaction. For example, when determining that the current message is associated with the transaction, first client service instance 140 may perform a lookup in the database for the transaction based on the received identifier and determine that an entry for the transaction exists in the database. If the transaction exists in the database, first client service instance 140 may then determine that a difference between a creation time associated with the entry for the transaction and a current time associated with the current message is less than a predetermined amount of time. The creation time may comprise the time that the first message was received by first client service instance 140. The current time associated with the current message may comprise the time that the current message was received by first client service instance 140. The predetermined amount of time may comprise an amount of time needed for a transaction comprising multiple message, for example, the predetermined amount of time may comprise DOCSIS 3-way handshake. The predetermined amount of time may comprise, but is not limited to, 200 ms. The predetermined amount of time may be set based on what the target service instance may need, for example, 1 second or 2 seconds.

After first client service instance 140 determines, based on the identifier, that the current message is associated with the transaction in stage 260, method 200 may proceed to stage 270 where first client service instance 140 may send, in response to determining that the current message is associated with the transaction, the current message to first target service instance 155 corresponding to the transaction. For example, because the transaction spanned multiple messages (e.g., the first message and the current message had the same identifier and were received within the predetermined amount of time) first client service instance 140 may send the messages in this transaction to the same target service instance (i.e., first target service instance 155).

If the time between the reception of the first message and the reception of the current message is greater than the predetermined amount of time even if first client service instance 140 determined that the entry for the transaction exists in the database, first client service instance 140 may clear the transaction from the database, start a new transaction in the database, and send the current message to another one of the plurality of target service instance 135 other than first target service instance 155. Once first client service instance 140 sends the current messages to first target service instance 155 corresponding to the transaction in stage 270, method 200 may then end at stage 280.

Figure 3:
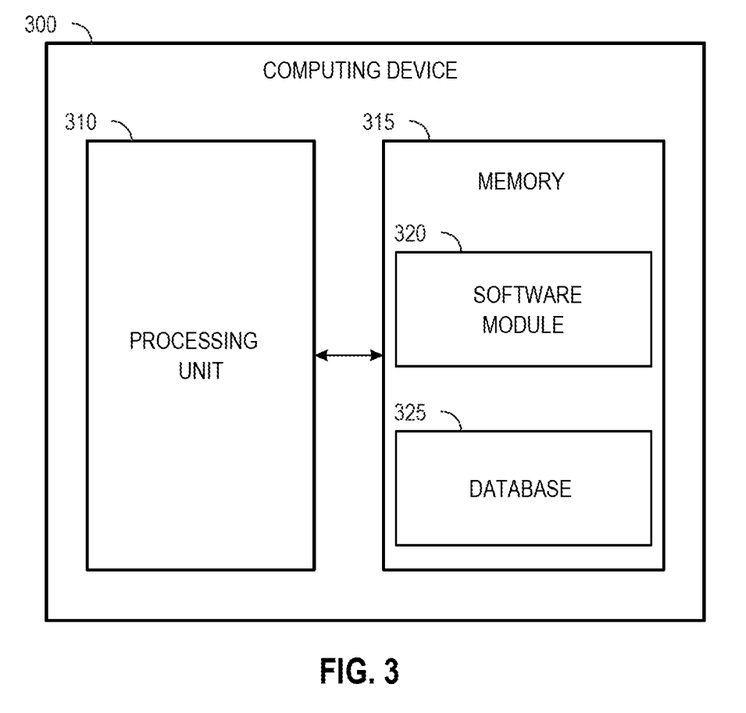
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing temporal transaction locality in a stateless environment, including for example, any one or more of the stages from method 200 described above with respect to FIG. 2. Computing device 300, for example, may provide an operating environment for client device 105, node 110, any of plurality client service instances 125, transaction persistence module and load balancer 130, and any of plurality of target service instances 135. Client device 105, node 110, any of plurality client service instances 125, transaction persistence module and load balancer 130, or any of plurality of target service instances 135 may operate in other environments and are not limited to computing device 300.

Computing device 300 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
receiving a current message having an identifier;
determining, based on the identifier, that the current message is associated with a transaction, wherein determining that the current message is associated with the transaction comprises determining, based on the identifier, that an entry for the transaction exists in a database;
determining a difference between a creation time associated with the entry for the transaction and a current time associated with the current message; and
sending, based on the difference between the creation time associated with the entry for the transaction and current time associated with the current message, the current message to a target service instance corresponding to the transaction, wherein sending, based on the difference between the creation time associated with the entry for the transaction and the current time associated with current message, the current message to the target service instance comprises:
determining that a difference between the creation time associated with the entry for the transaction and the current time associated with the current message is less than a predetermined amount of time wherein determining that the difference between the creation time associated with the entry for the transaction and the current time associated with the current message is less than the predetermined amount of time comprise determining that the difference between the creation time associated with the entry for the transaction and the current time associated with the current message is less than the predetermined amount of time wherein the predetermined amount of time comprises an amount of time needed for a Data Over Cable Service Interface Specification (DOCSIS) 3-way handshake, and
sending, in response to determining that the difference between the creation time associated with the entry for the transaction and the current time associated with the current message is less than the predetermined time, the current message to a same target service instance associated with the entry for the transaction.

2. The method of claim 1, further comprising, prior to receiving the current message:
receiving a first message having the identifier;
determining, based on the identifier, that an entry for the transaction does not exist in a database;
creating, in response to determining that the entry for the transaction does not exist in the database, the entry for the transaction in the database, wherein the entry for the transaction indicates the target service instance and a creation time; and
sending the first message to the target service instance corresponding to the transaction.

3. The method of claim 2, wherein creating the entry for the transaction in the database comprises creating the entry for the transaction in the database wherein the creation time comprises a time that the first message was received.

4. The method of claim 1, wherein determining that the difference between the creation time associated with the entry for the transaction and the current time associated with the current message is less than the predetermined amount of time comprises determining that the difference between the creation time associated with the entry for the transaction and the current time associated with the current message is less than the predetermined amount of time wherein the current time associated with the current message comprises a time that the current message was received.

5. The method of claim 1, wherein determining that the difference between the creation time associated with the entry for the transaction and the current time associated with the current message is less than the predetermined amount of time comprise determining that the difference between the creation time associated with the entry for the transaction and the current time associated with the current message is less than the predetermined amount of time wherein the predetermined amount of time comprises 200 ms.

6. The method of claim 1, wherein receiving the current message having the identifier comprises receiving the current message having the identifier wherein the identifier is based on at least one of the following: a Media Access Control (MAC) address of a Cable Modem (CM) corresponding to a client device from which the current message was received; a Remote Physical Layer (R-PHY) node identifier corresponding to a node from which the current message was received; and a Layer 2 Tunneling Protocol Version 3 session corresponding to the current message.

7. A system comprising:
a memory storage; and
a processor coupled to the memory storage, wherein the processor is operative to:
receive a current message having an identifier;
determine, based on the identifier, that the current message is associated with a transaction, wherein the processor being operative to determine that the current message is associated with the transaction comprises the processor being operative to determine, based on the identifier, that an entry for the transaction exists in a database;
determine that a difference between a creation time associated with the entry for the transaction and a current time associated with the current message; and
send, based on the difference between the creating time associated with the entry for the transaction and the current time associated with the current message, the current message to a target service instance, wherein the processor being operative to send, based on the difference between the creation time associated with the entry for the transaction and the current time associated with current message, the current message to the target service instance comprises the processor being operative to:
determine that a difference between the creation time associated with the entry for the transaction and the current time associated with the current message is less than a predetermined amount of time wherein the predetermined amount of time comprises an amount of time needed for a Data Over Cable Service Interface Specification (DOCSIS) 3-way handshake, and
send, in response to determining that the difference between the creation time associated with the entry for the transaction and the current time associated with the current message is less than the predetermined time, the current message to a same target service instance associated with the entry for the transaction.

8. The system of claim 7, wherein the processor is further operative to:
receive a first message having the identifier;
determine, based on the identifier, that an entry for the transaction does not exist in a database;
create, in response to determining that the entry for the transaction does not exist in the database, the entry for the transaction in the database, wherein the entry for the transaction indicates the target service instance and a creation time; and
send the first message to the target service instance corresponding to the transaction.

9. The system of claim 8, wherein the creation time comprises a time that the first message was received.

10. The system of claim 7, wherein the current time associated with the current message comprises a time that the current message was received.

11. The system of claim 7, wherein the predetermined amount of time comprises 200 ms.

12. The system of claim 7, wherein the identifier is based on at least one of the following: a Media Access Control (MAC) address of a Cable Modem (CM) corresponding to a client device from which the current message was received; a Remote Physical Layer (R-PHY) node identifier corresponding to a node from which the current message was received; and a Layer 2 Tunneling Protocol Version 3 session corresponding to the current message.

13. A non-transitory computer-readable medium that stores a set of instructions which when executed perform a method executed by the set of instructions comprising:
receiving a current message having an identifier;
determining, based on the identifier, that the current message is associated with a transaction, wherein determining that the current message is associated with the transaction comprises determining, based on the identifier, that an entry for the transaction exists in a database;
determining a difference between a creation time associated with the entry for the transaction and a current time associated with the current message; and
sending, based on the determined difference between the creation time associated with the entry for the transaction and the current time associated with the current message, the current message to a target service instance, wherein sending, based on the difference between the creation time associated with the entry for the transaction and the current time associated with current message, the current message to the target service instance comprises:
determining that a difference between the creation time associated with the entry for the transaction and the current time associated with the current message is less than a predetermined amount of time wherein determining that the difference between the creation time associated with the entry for the transaction and the current time associated with the current message is less than the predetermined amount of time comprise determining that the difference between the creation time associated with the entry for the transaction and the current time associated with the current message is less than the predetermined amount of time wherein the predetermined amount of time comprises an amount of time needed for a Data Over Cable Service Interface Specification (DOCSIS) 3-way handshake, and
sending, when the difference between the creation time associated with the entry for the transaction and the current time associated with the current message is less than the predetermined time, to a same target service instance associated with the entry for the transaction.

14. The non-transitory computer-readable medium of claim 13, further comprising, prior to receiving the current message:
receiving a first message having the identifier;
determining, based on the identifier, that an entry for the transaction does not exist in a database;
creating, in response to determining that the entry for the transaction does not exist in the database, the entry for the transaction in the database, wherein the entry for the transaction indicates the target service instance and a creation time; and
sending the first message to the target service instance corresponding to the transaction.

15. The non-transitory computer-readable medium of claim 13, wherein determining that the difference between the creation time associated with the entry for the transaction and the current time associated with the current message is less than the predetermined amount of time comprise determining that the difference between the creation time associated with the entry for the transaction and the current time associated with the current message is less than the predetermined amount of time wherein the predetermined amount of time comprises an amount of time needed for a Data Over Cable Service Interface Specification (DOCSIS) 3-way handshake.

16. The non-transitory computer-readable medium of claim 13, wherein determining that the difference between the creation time associated with the entry for the transaction and the current time associated with the current message is less than the predetermined amount of time comprises determining that the difference between the creation time associated with the entry for the transaction and the current time associated with the current message is less than the predetermined amount of time wherein the current time associated with the current message comprises a time that the current message was received.

17. The non-transitory computer-readable medium of claim 13, wherein determining that the difference between the creation time associated with the entry for the transaction and the current time associated with the current message is less than the predetermined amount of time comprise determining that the difference between the creation time associated with the entry for the transaction and the current time associated with the current message is less than the predetermined amount of time wherein the predetermined amount of time comprises 200 ms.

18. The non-transitory computer-readable medium of claim 13, receiving the current message having the identifier comprises receiving the current message having the identifier wherein the identifier is based on at least one of the following: a Media Access Control (MAC) address of a Cable Modem (CM) corresponding to a client device from which the current message was received; a Remote Physical Layer (R-PHY) node identifier corresponding to a node from which the current message was received; and a Layer 2 Tunneling Protocol Version 3 session corresponding to the current message.

* * * * *